(12) United States Patent  (10) Patent No.: US 6,526,172 B1
Arai  (45) Date of Patent: Feb. 25, 2003

(54) CODING METHOD AND CODER USING PATTERN MATCHING

(75) Inventor: Mitsutoshi Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/492,461

(22) Filed: Jan. 27, 2000

(30) Foreign Application Priority Data

Jan. 27, 1999 (JP) .......................................... 11-019141

(51) Int. Cl.[7] ................................................. G06K 9/36
(52) U.S. Cl. ..................................................... 382/232
(58) Field of Search ............................... 382/232, 237, 382/251, 252, 266, 270; 358/1.9, 3.01, 3.24, 2.1, 434–436, 448, 462, 465, 466, 488, 526, 530, 534–536, 539, 456, 457

(56) References Cited

U.S. PATENT DOCUMENTS 4,903,147 A  *  2/1990  Kanno et al. ................ 358/448
5,027,227 A  *  6/1991  Kita ............................ 358/488
5,606,432 A  *  2/1997  Ohtsuka et al. ............. 358/527
5,825,932 A  *  10/1998  Inoue .......................... 382/237
5,926,571 A  *  7/1999  Inoue .......................... 382/237
6,208,430 B1  *  3/2001  Hains et al. ................. 358/1.9
6,262,811 B1  *  7/2001  Hains et al. ................. 358/1.9

FOREIGN PATENT DOCUMENTS

JP  11-308464  11/1999

OTHER PUBLICATIONS

Howard, "Lossless And Lossy Compression of Text Images By Soft Pattern Matching", Jun. 30, 1995.

* cited by examiner

Primary Examiner—Jose L. Couso
(74) Attorney, Agent, or Firm—Foley & Lardner

(57) ABSTRACT

A dot angle conversion unit 21 converts the dot angle of image data in an image area, separated by a boundary tracing unit 12, into 0 degree or 45 degrees. An in-mark correlation checking unit 22 determines a dot frequency of the image data whose dot angle has been converted. A mark re-dividing unit 23 generates small-sized marks based on the dot frequency. A match determination unit 13 checks if a library contains a mark that matches the extracted mark. If the library contains a matching mark, the match determination unit 13 outputs both the extracted mark and the matching mark in the library to a match template processing unit 32.

16 Claims, 11 Drawing Sheets

FIG. 10 (A)

| COUNTER | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| ADDRESS | 0 | 1 | 2 | 3 | 4 | 5 | 6 | 7 | 8 | 9 | 10 | 11 | 12 | 13 | 14 | 15 | 16 | 17 | 18 | 19 |
| LINE MEMORY A | ○ | ○ |   |   |   | ○ | ○ |   |   |   | ○ | ○ |   |   |   | ○ | ○ |   |   |   |
| LINE MEMORY B |   |   | ○ |   |   |   |   | ○ |   |   |   |   | ○ |   |   |   |   | ○ |   |   |
| LINE MEMORY C |   |   |   | ○ | ○ |   |   |   | ○ | ○ |   |   |   | ○ | ○ |   |   |   |   |   |
| LINE MEMORY D |   |   |   |   |   | ○ |   |   |   |   | ○ |   |   |   |   | ○ |   |   |   |   |
| LINE MEMORY E | × | × | × | × | × | × | × | × | × | × | × | × | × | × | × | × | × | × | × | × |

FIG. 10 (B)

| COUNTER | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| ADDRESS | 0 | 1 | 2 | 3 | 4 | 5 | 6 | 7 | 8 | 9 | 10 | 11 | 12 | 13 | 14 | 15 | 16 | 17 | 18 | 19 |
| LINE MEMORY A | × | × | × | × | × | × | × | × | × | × | × | × | × | × | × | × | × | × | × | × |
| LINE MEMORY B | ○ | ○ |   |   |   | ○ | ○ |   |   |   | ○ | ○ |   |   |   | ○ | ○ |   |   |   |
| LINE MEMORY C |   |   | ○ |   |   |   |   | ○ |   |   |   |   | ○ |   |   |   |   |   |   |   |
| LINE MEMORY D |   |   |   | ○ | ○ |   |   |   | ○ | ○ |   |   |   | ○ | ○ |   |   |   |   |   |
| LINE MEMORY E |   |   |   |   |   | ○ |   |   |   |   | ○ |   |   |   |   | ○ |   |   |   |   |

FIG. 10 (C)

| COUNTER | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|
| ADDRESS | 0 | 1 | 2 | 3 | 4 | 5 | 6 | 7 | 8 | 9 | 10 | 11 | 12 | 13 | 14 | 15 | 16 | 17 | 18 | 19 |
| LINE MEMORY A |   |   |   | ○ |   |   |   |   | ○ |   |   |   |   | ○ |   |   |   |   |   |   |
| LINE MEMORY B | × | × | × | × | × | × | × | × | × | × | × | × | × | × | × | × | × | × | × | × |
| LINE MEMORY C | ○ | ○ |   |   |   | ○ | ○ |   |   |   | ○ | ○ |   |   |   | ○ | ○ |   |   |   |
| LINE MEMORY D |   |   | ○ |   |   |   |   | ○ |   |   |   |   | ○ |   |   |   |   |   |   |   |
| LINE MEMORY E |   |   |   | ○ | ○ |   |   |   | ○ | ○ |   |   |   | ○ | ○ |   |   |   |   |   |

FIG. 11 (D)

```
COUNTER  61 62 63 64 65 66 67 68 69 70 71 72 73 74 75 76 77 78 79 80
ADDRESS   0  1  2  3  4  5  6  7  8  9 10 11 12 13 14 15 16 17 18 19
```

LINE MEMORY A — positions with ○: 2, 3, 8, 9, 14, 15
LINE MEMORY B — positions with ○: 5, 11, 17
LINE MEMORY C — all positions marked ×
LINE MEMORY D — positions with ○: 0, 1, 6, 7, 12, 13, 18, 19
LINE MEMORY E — positions with ○: 3, 9, 15

FIG. 11 (E)

```
COUNTER  81 82 83 84 85 86 87 88 89 90 91 92 93 94 95 96 97 98 99 100
ADDRESS   0  1  2  3  4  5  6  7  8  9 10 11 12 13 14 15 16 17 18 19
```

LINE MEMORY A — positions with ○: 2, 8, 14
LINE MEMORY B — positions with ○: 3, 4, 9, 10, 15, 16
LINE MEMORY C — positions with ○: 5, 11, 17
LINE MEMORY D — all positions marked ×
LINE MEMORY E — positions with ○: 0, 1, 6, 7, 12, 13, 18, 19

FIG. 12

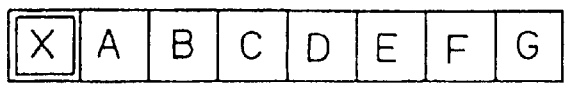

X ··· REFERENCE PIXEL
A ~ G ··· OBSERVATION PIXELS

FIG. 15 (A)

|   |   |   |
|---|---|---|
| 1 | 2 | 3 |
| 4 | P |   |

FIG. 15 (B)

|   |   |   |
|---|---|---|
|   | 5 |   |
| 6 | 7 | 8 |
| 9 | 10| 11|

FIG. 16

|   |   |   |   |   |
|---|---|---|---|---|
|   | 1 | 2 | 3 |   |
| 4 | 5 | 6 | 7 | 8 |
|   | 9 | 10| P |   |

CODING METHOD AND CODER USING PATTERN MATCHING

FIELD OF THE INVENTION

The present invention relates to a coding method and a coder effectively using pattern matching, and more particularly to a coding method and a coder using pattern matching capable of coding image data, including character areas and image areas, at a high compression rate.

BACKGROUND OF THE INVENTION

A coding method using pattern matching is known as a method for compressing binary data including character areas and image areas. For example, the pattern matching coding method described in ISO/IEC JTC1/SC29/WG1 N205 "Loseless and Lossy Compression of Text Images by Soft Pattern Matching" (issued on Jun. 30, 1995) extracts a small unit (hereinafter called "mark"), for example, one character unit at a time, from the image, and compares it with a plurality of marks stored previously in the library. When the library contains a mark matching the extracted mark, the extracted mark is coded while referencing the mark in the library. The "match" in this description includes a perfect match as well as a close match (i.e., close to a perfect match).

FIG. 14 is a block diagram showing the configuration of a coder which executes the coding method described in the above publication. As shown in FIG. 14, a character/image separation unit 200 separates image data received from an input terminal 1 into two types of areas: a character area where characters concentrate and an image area where characters do not concentrate. The image data in the character area is output to a mark extraction unit 201, while the image data in the image area is output to a coding unit 202.

The mark extraction unit 200 extracts characters from a character area, one character at a time. The extracted character is treated as a mark. Extracted marks are output to a match checking unit 203 and a storage unit 204. The match checking unit 203 checks if the library contains a mark that matches an extracted mark. If there is a matching mark, the match checking unit 203 outputs the extracted mark and the matching mark found in the library to a coding unit 205. The storage unit 204, which creates the library, adds received marks to the library.

The coding unit 205 performs arithmetic coding using the templates shown in FIGS. 15(A) and 15(B). That is, using the reference pixels (indicated by numbers 1–4) in the template, shown in FIG. 15(A), for the extracted mark and the reference pixels (indicated by numbers 5–11) in the template, shown in FIG. 15(B), for the extracted mark, the coding unit 205 estimates the probability at which the pixel level of the processing target pixel is, for example, 1. In general, the coding unit 205 assigns a short code to the probability of 100% or 0%, and a longer code as the probability approaches 50%.

The reference pixel position at number 7 in FIG. 15(B) corresponds to the position of P which is the processing target pixel. In the following description, the templates shown in FIGS. 15(A) and 15(B) are called match templates.

When the library does not contain a mark that matches the extracted mark, the coding unit 205 performs arithmetic coding using the template shown in FIG. 16. That is, using the reference pixels (indicated by numbers 1–10) in the template shown in FIG. 16, the coding unit 205 estimates the probability that the pixel level of the processing target pixel P becomes "1" and performs arithmetic coding for the estimated probability. In the following description, the template shown in FIG. 16 is called "unmatched template".

The coding unit 202 receives image data of an image area and codes it using a coding method suitable for compressing general binary data, for example, using the JBIG method. Coded data output from the coding units 202 and 205 is output from an output terminal 3.

SUMMARY OF THE DISCLOSURE

As described above, when the library contains a mark that matches an extracted mark, the match template is used. That is, not only the preceding pixels in the extracted mark (past pixels in the scan direction: pixels 1–4) but also those pixels ahead of (beyond) a position of the processing target pixel (future pixels in the scan direction: pixels 8–11) in the mark having a high correlation with the extracted mark are used to estimate the pixel level of the processing target pixel position P. Therefore, the estimated result is more likely to be 100% or 0% and, as a result, the amount of data is reduced.

However, in the above-described coding method, the coding efficiency of an image area is not high because a standard coding method is used for it. Thus, when the image area is relatively large, the compression rate is not increased. In addition, the need to install two coding units, 202 and 205, increases the size of the coder circuit.

The inventor of the present invention has disclosed in Japanese Patent Application No. Hei 10-110835 a coder which checks the dot frequency interval (herein may be termed as simply "frequency") in an image area to allow a mark in the library matching an extracted mark to be used even in the image area, that is, a coder which may use a match template. Such a unit, when used, for example, in a newspaper telephotography system having relatively large dot areas, increases coding efficiency and decreases the circuit size.

However, in a system such as a color paper telephotography system, the dot angle of image data in one color differs from that of image data in another color to prevent such occurrence as Moiré. Therefore, the dot angle of image data is not always 0 degree or 45 degrees. For example, such a combination is used of a dot angle of 15 degrees in a cyan image, a dot angle of 45 degrees in a magenta image, a dot angle of 0 degree in a yellow image, and a dot angle of 75 degrees in a black image. Note that the dot angle is defined as an angle of a sequence of dots with respect to the sub scan direction of the image.

It is easy to find a dot frequency (interval) when the dot angle is 0 degree or 45 degrees. However, it is difficult to find a dot frequency when the dot angle is not 0 degree or 45 degrees. This results in more cases where no mark that matches the extracted mark is found in the library. In this case, the coding efficiency is lower than a case where the library contains the match matching the extracted mark.

In view of the foregoing, it is an object of the present invention to provide a coding method and a coder which use pattern matching that ensures high coding efficiency even when the dot angle is not 0 degree or 45 degrees as in a color paper telephotography system.

According to an aspect of the present invention, there is provided a coding method using pattern matching comprises the steps of: separating an image area from the image data; converting a dot angle of the image data in the image area to a specific angle; finding a dot frequency (interval) of the image data whose dot angle has been converted; and dividing the image data, whose dot angle has been converted, by the dot frequency or by an integral multiple of the dot frequency into a plurality of marks. This configuration allows even an image area to be coded through pattern matching and, at the same time, the dot frequency to be found easily, thus enabling marks to be generated effectively using pattern matching.

The specific angle for use in dot angle conversion is, for example, 0 degree or 45 degrees so that the dot frequency is easily found.

When the library contains the matching first mark, pixels positioned ahead of (beyond) a position of a processing target pixel may also be included in the reference pixels. The pixels positioned ahead of the position of the processing target pixel are future pixels that are in the scan direction. Therefore, the estimated result is more likely to be 100% or 0% and, as a result, the amount of code data is reduced.

When the library does not contain the matching first mark, the pixels of the mark that are in a predetermined template may be used as reference pixels.

A newly found mark may be added to the library. This configuration allows the library to grow as coding processing proceeds, ensuring a higher coding efficiency.

According to a second aspect of the present invention, there is provided a coder using pattern matching comprising: a character/image separation unit which extracts an image area from the image data; a dot angle conversion unit which converts a dot angle of the image data in the image area into a specific angle, the image area being extracted by the character/image separation unit; a dot frequency (interval) detecting unit which finds a dot frequency from the image data converted by the dot angle conversion unit; and a mark re-dividing unit which divides the image data, converted by the dot angle conversion unit, by a result found by the dot frequency detecting unit to generate marks for output to the match determination unit. This configuration allows even an image area to be coded through pattern matching and, at the same time, the dot frequency (interval) to be found easily, thus enabling marks to be generated effectively using pattern matching.

The mark re-dividing unit, for example, is configured to divide the image data by the dot frequency or by an integral multiple of the dot frequency, the image data being converted by the dot angle conversion unit.

The dot frequency detecting unit, for example, is configured to find correlation of the image data converted by the dot angle conversion unit.

The dot angle conversion unit may have a plurality of memories containing the image data converted by the dot angle conversion unit and converts the image data by writing the image data into, or reading the image data from, the memories in a direction inclined by a difference angle between the dot angle and the specific angle.

The coding unit may comprise a match template processing unit which, if the library contains the matching first mark, uses the pixels of a template of the first mark in the library and pixels of a predetermined template of the second mark in the input image data as reference pixels; an unmatch template processing unit which, if the library does not contain the matching first mark, uses pixels of a predetermined unmatch template of the second mark in the input image data as the reference pixels; and an arithmetic coding unit which estimates a probability of a pixel level of a processing target pixel using reference pixel values from the match template processing unit and the unmatch template processing unit and arithmetically codes the estimation value.

BRIEF DESCRIPTION OF THE DRAWINGS

FIGS. 10(A)–10(C) are diagrams illustrating an example of dot angle conversion.

FIGS. 11(D)–11(E) are diagrams illustrating an example of dot angle conversion.

FIG. 12 is a diagram illustrating an example of observation windows used by an in-mark correlation checking unit to find a dot frequency.

FIGS. 15(A)–15(B) are diagrams illustrating an examples of a match templates.

FIG. 16 is a diagram illustrating an example of an unmatch template.

PREFERRED EMBODIMENTS OF THE INVENTION

An embodiment of the present invention will now be described more in detail with reference to the drawings.

Figure 1:
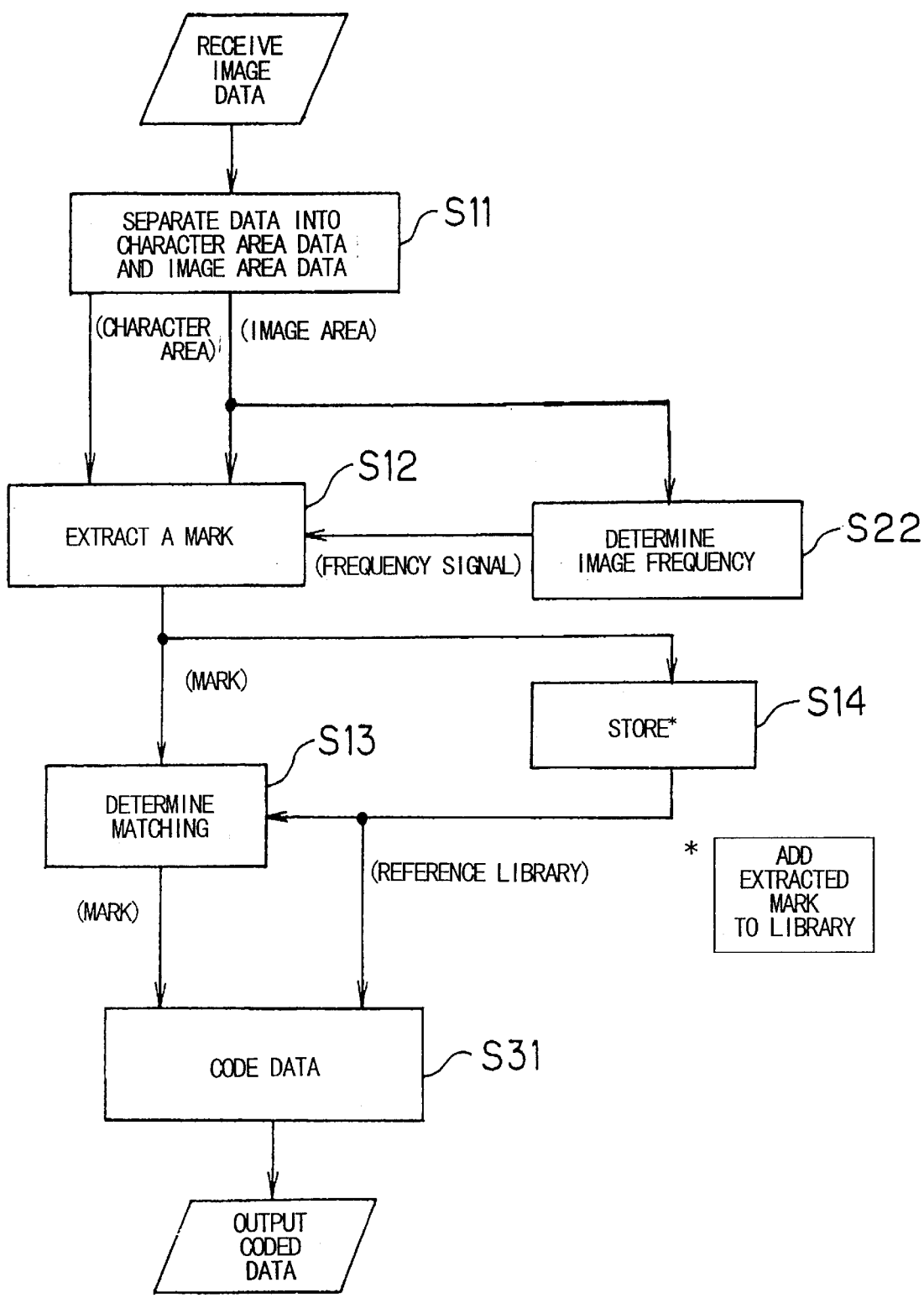
FIG. 1 is a flowchart showing an overview of a coding method that forms the basis of the present invention.

First, referring to the flowchart shown in FIG. 1, a coding method disclosed in Japanese Patent Application No. Hei 10-110835 will be described. First, character/image separation processing (step S11) is performed on received image data to separate it into character area data and image area data. Areas are separated into character areas and image areas, for example, by obtaining projections in the main scan direction and in the sub scan direction. That is, the number of black pixels is accumulated for each line in the main scan direction and in the sub scan direction to find white lines and white-and-black lines on which white pixels and black pixels are mixed. An area containing white lines is assumed to be a character area, while an area not containing white lines is assumed to be an image area. Then, mark extraction processing is performed to extract marks from data in the character areas (step S12). A mark in a character area is, for example, one character.

For data in an image area, image frequency determination processing is performed to determine the dot image frequency (interval) (step S22). Based on the dot frequency that is found through image frequency determination processing, mark extract ion processing is performed to extract marks from data in the image area (step S12). It is assumed that the mark size is equal to, or an integral multiple of, the dot frequency.

For each mark extracted through mark extraction processing, match determination processing is performed, as in the conventional method, to determine if the library contains a matching mark (step S13). When the library contains a matching mark, both the extracted mark and the matching mark are output to the coding step. Also, the (new) extracted mark is added to the library for storage (step S14). In step S31 in which coding processing is performed, arithmetic coding is performed using match templates and unmatch templates as in the conventional method.

By performing the processing steps described above, a mark is extracted from data in an image area according to the frequency information on the dot image. Because the difference between the marks extracted according to the dot frequency is small, the possibility that the library contains a mark that matches a newly-extracted mark is increased. This enables coding to be performed effectively with the use of match templates and ensures a high coding efficiency. Therefore, highly-efficient coded data may be generated in systems, such as a newspaper telephotography system, where relatively greater extent of (or many) dot areas are used.

However, when the dot angle is not 0 degree or 45 degrees as in a system such as a color newspaper telephotography system, the correct dot frequency cannot be found if dot frequency checking (determination) would performed as if the dot angle was 0 degree or 45 degrees. As a result, a large-sized mark is extracted and, in many cases, the library does not contain a mark that matches the extracted mark. In such a case, coding processing is performed using unmatch templates, and thus the coding efficiency remains low.

Figure 2:
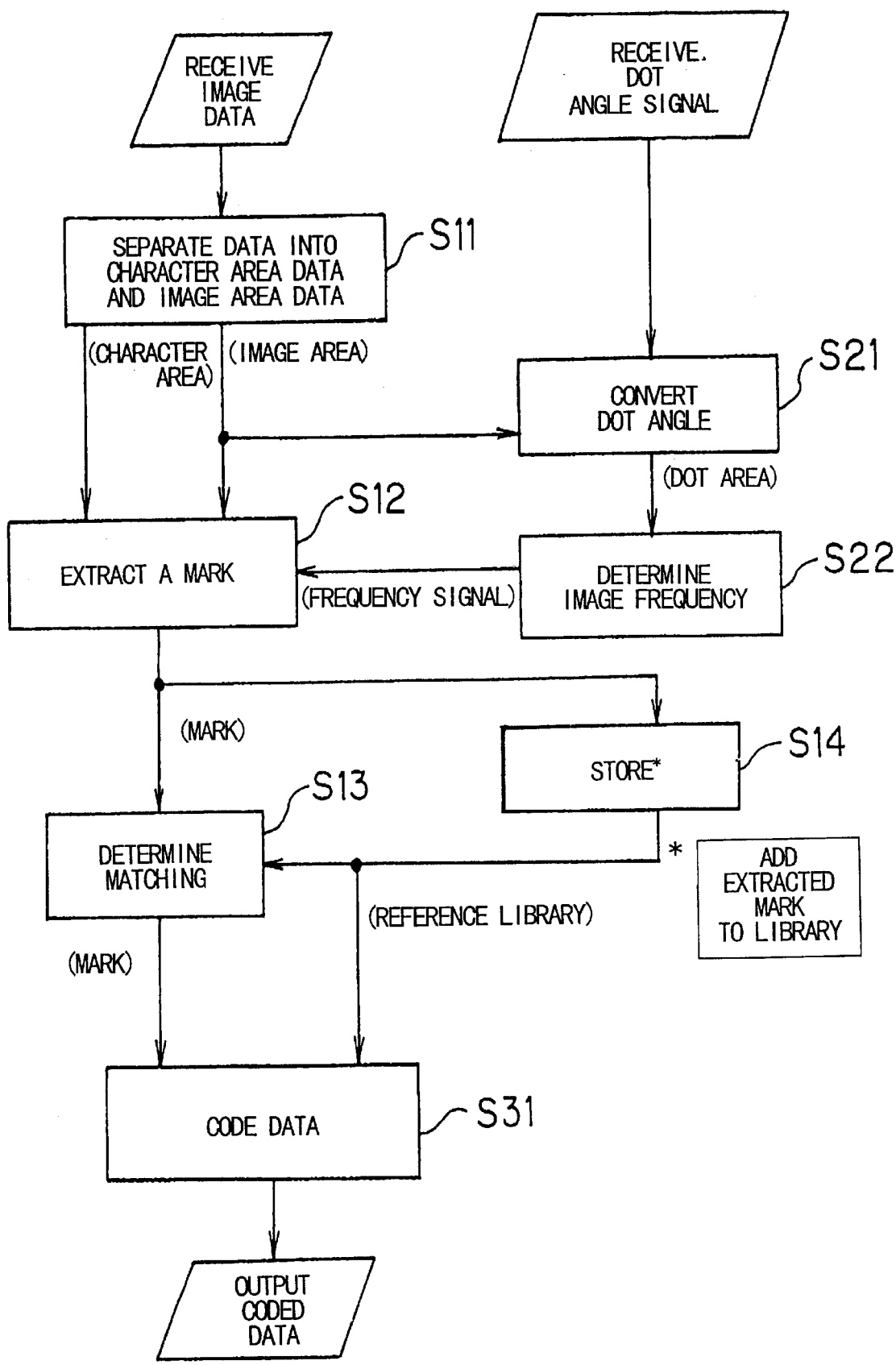
FIG. 2 is a flowchart showing an overview of a coding method according to the present invention.

In view of the foregoing, the embodiment according to the present invention performs dot angle conversion before determining the dot frequency. FIG. 2 is a flowchart showing one embodiment of the coding method according to the present invention. As shown in the figure, character/image separation processing (step S11) is performed on received image data to separate it into character area data and image area data. Then, mark extraction processing is performed to extract a mark from data in the character area (step S12).

The dot angle signal is sent from a superordinate system (e.g., host system) which created data such as newspaper data. With this signal as an input, the dot angle of image data in the image area created through character/image separation processing is converted to 0 degree or 45 degrees (step S21). Then, for the image data for which dot angle conversion has been performed, image frequency determination processing is performed to determine the frequency (interval) of the dot image (step S22). Based on the dot frequency that is found through image frequency determination processing, mark extraction processing is performed to extract marks from data in the image area (step S12). Again, it is assumed in this example that the mark size is equal to, or an integral multiple of, the dot frequency (interval).

Then, for a mark extracted through mark extraction processing, match determination processing is performed, as in the conventional method, to check if the library contains a mark that matches the extracted mark (step S13). If the library contains a matching mark, both the extracted mark and the mark found in the library are sent to the coding processing step. Also, the extracted mark is added to the library (step S14). In the coding processing in step S31, a match template or an unmatch template is used as in the conventional method.

Figure 3:
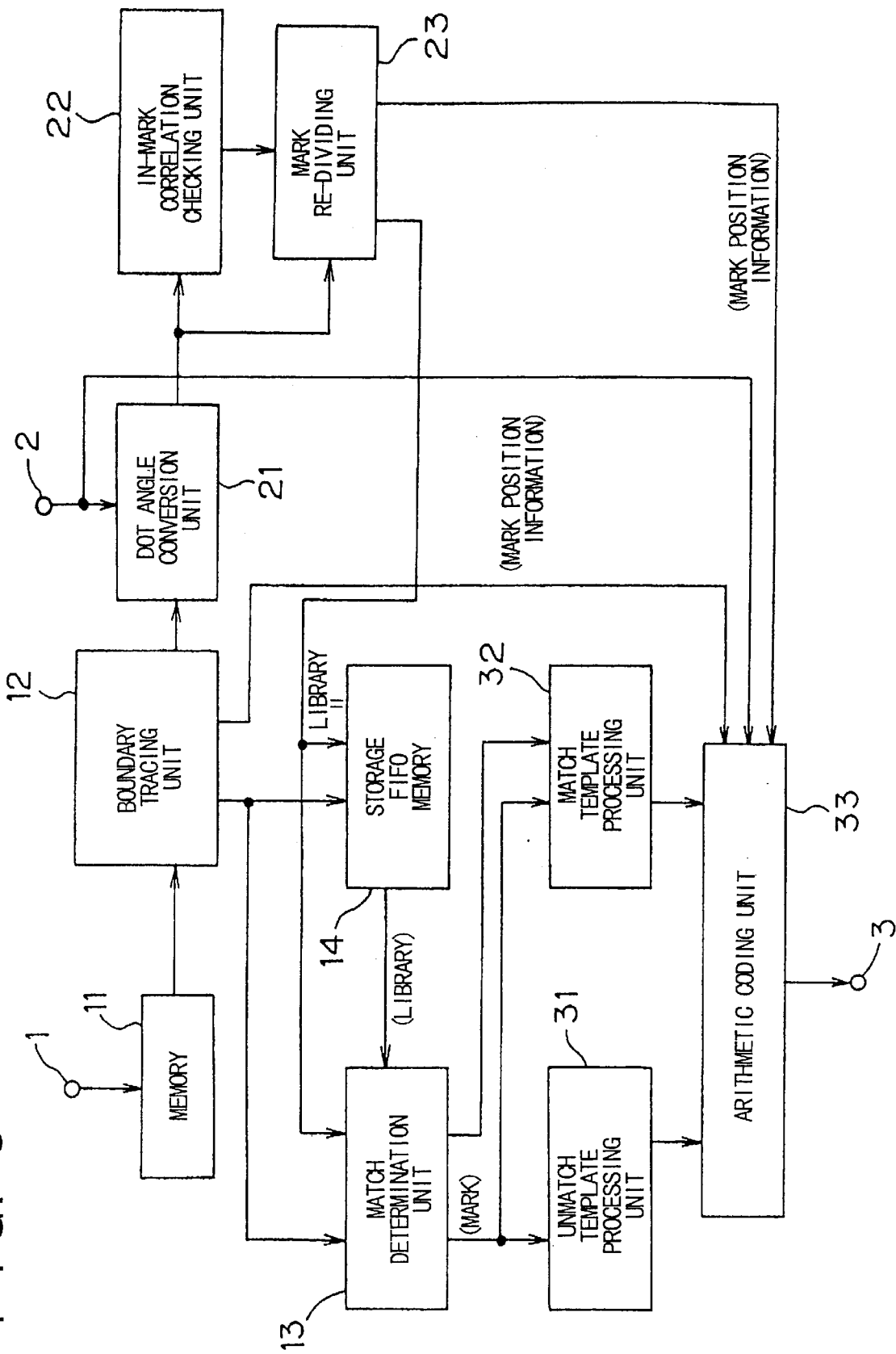
FIG. 3 is a block diagram showing an example of the configuration of the coder according to the present invention.

FIG. 3 is a block diagram showing an example of the configuration of the coder that executes the coding method shown in FIG. 2. In the configuration shown in FIG. 3, image data sent to an input terminal 1 is once stored in a memory 11. A boundary tracing unit 12, which performs character/image separation processing and mark extraction processing, outputs a mark contained in the character area to a match determination unit 13 and a storage FIFO memory 14. At the same time, the boundary tracing unit 12 outputs data in the image area to a dot angle conversion unit 21. Note that the storage FIFO memory 14 is used as the library.

The dot angle conversion unit 21 receives data in the image area as well as a dot angle signal via a dot angle signal input terminal 2. The data input to the dot angle conversion unit 21 is a mark in the image area. The mark is large in size. The dot angle conversion unit 21 performs dot angle conversion on the data in the image area according to the dot angle signal. The data for which angle conversion has been made is output to an in-mark correlation checking unit 22 and a mark re-dividing unit 23.

The in-mark correlation checking unit 22 finds the dot frequency of the image data it receives. The mark re-dividing unit 23 divides the received image data by the dot frequency (interval) or by an integral multiple of the dot frequency to generate small-sized (divided) marks. The mark re-dividing unit 23 then outputs each mark to the match determination unit 13 and the storage FIFO memory 14. In other words, the in-mark correlation checking unit 22 performs dot frequency determination processing shown in FIG. 2, while the mark re-dividing unit 23 performs mark extraction processing (image area) shown in FIG. 2.

The match determination unit 13 uses the mark it receives and the mark in the library sent from the storage FIFO memory 14 to perform mark extraction processing shown in FIG. 2. When the library does not contain a mark that matches the received mark, an unmatch template processing unit 31 outputs pixel values of the unmatch template to an arithmetic coding unit (coder) 33. When the library contains a mark that matches the received mark, a match template processing unit 32 outputs pixel values of the match template to the arithmetic coder 33.

Using the reference pixel values received from the unmatch template processing unit 31 or the match template processing unit 32, the arithmetic coder 33 estimates, for example, the probability that the pixel level of the processing target pixel P is "1". More specifically, the arithmetic coder 33 has a probability estimation table containing probability values each corresponding to a combination of reference pixel values. In response to a reference pixel value, this probability estimation table gives the corresponding probability value.

The obtained probability value is arithmetically coded. The arithmetic coder 33 assigns a short code to the probability of 100% or 0%, and a longer code to the probability that is close to 50%. The arithmetic coder 33 then outputs the coded data to an output terminal 3. To pass the dot angle and the mark position information to a decoder, the arithmetic coder 33 also receives the dot angle signal as well as the mark position information from the boundary tracing unit 12 and the mark re-dividing unit 23. The arithmetic coder 33 codes that information too.

Next, the operation of the coder will be described in detail.

Figure 4:
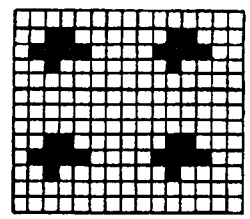
FIG. 4 is a diagram illustrating an area in which dots are isolated with each other.

The boundary tracing unit 12 sequentially reads image data from the memory 11 and traces the boundary of the data to extract a block of black pixels. When the extracted block is equal to or smaller than the predetermined size, the boundary tracing unit 12 determines that the block is a mark in the character area or an area composed of isolated dots in the image area. The area of isolated dots refers to an area composed of dots each isolated from the neighboring dot, such as the one shown in FIG. 4.

Figure 5:
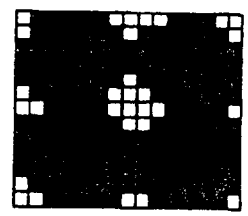
FIG. 5 is a diagram illustrating an area in which a plurality of dots are connected.
Figure 6:
FIG. 6 is a diagram illustrating an example of a mark generated by dividing an area, composed of a plurality of connected dots, by a dot frequency.

When an extracted block exceeds the predetermined size, the block is assumed to be an area composed of a plurality of dots connected with each other, as shown in FIG. 5. Tracing the boundary of the area such as the one shown in FIG. 5 would extract the whole connected area as a mark. However, the mark extracted in this way is too large, meaning that the library is less likely to contain a mark that matches the extracted mark. The area like this must therefore be divided. It is not only reasonable but also easy to divide such an area by the dot frequency or by an integral multiple of the dot frequency. FIG. 6 shows an example of a mark generated by dividing the area, shown in FIG. 5, by the dot frequency (interval).

Figure 7:
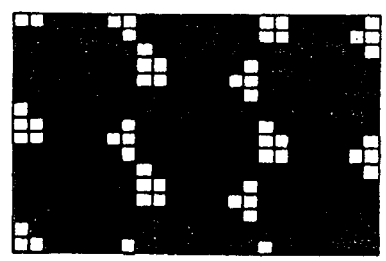
FIG. 7 is a diagram illustrating an example of a dot area whose dot angle is 30 degrees.

The area shown in FIG. 5, which has the dot angle of 0 degree, is easy to divide. However, it is difficult to divide a dot area, which has a dot angle that is neither 0 degree nor 45 degrees, by the dot frequency or by an integral multiple of dot frequency. This is because it is difficult to find the dot frequency. FIG. 7 shows an example of a dot area which has the dot angle of 30 degrees. The dot angle conversion unit 21 converts image data in a dot area whose dot angle is neither 0 degree nor 45 degrees into image data, for example, with the dot angle of 0 degree.

Figure 8:
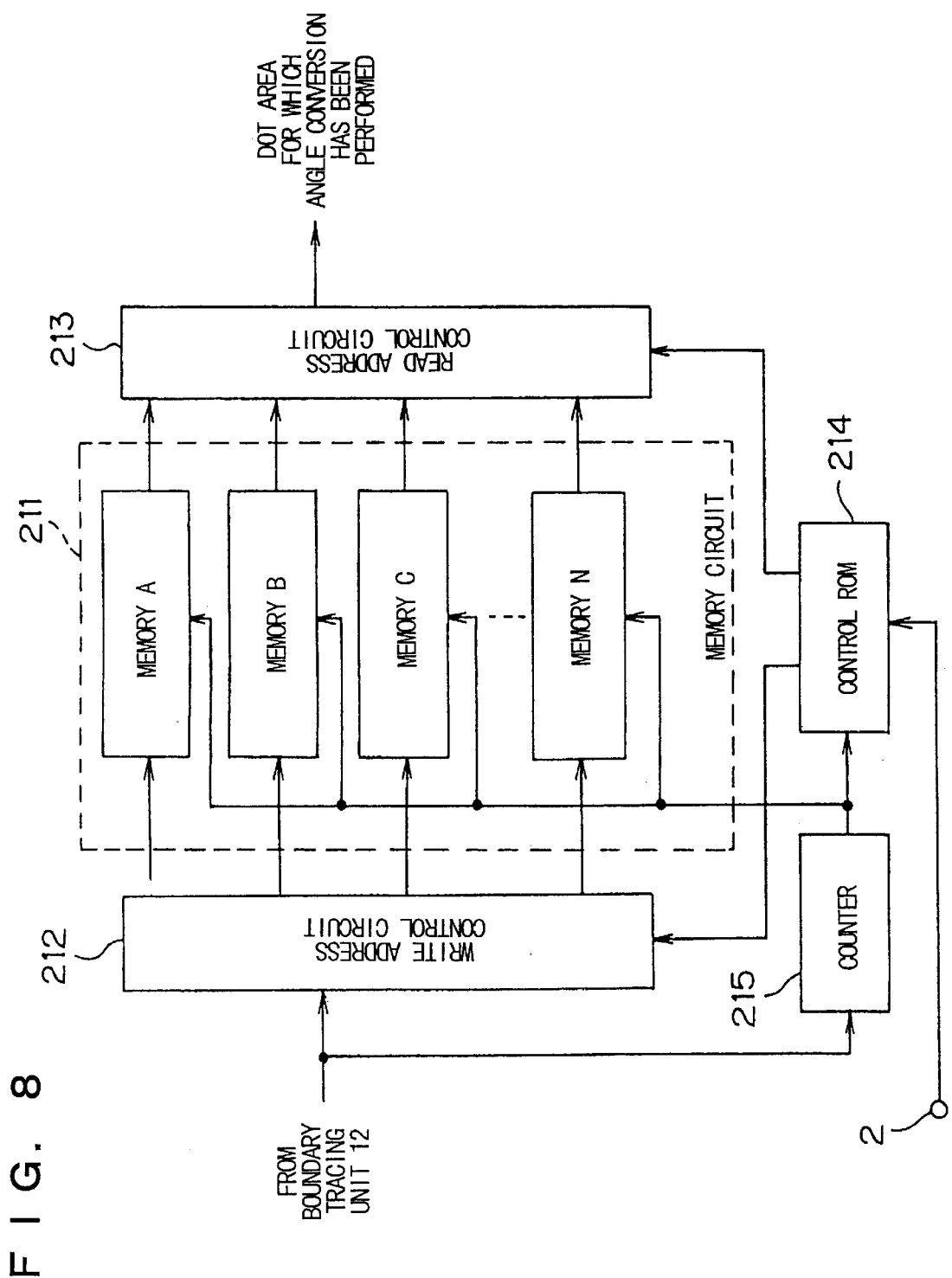
FIG. 8 is a block diagram showing an example of the configuration of a dot angle conversion unit.

FIG. 8 is a block diagram showing an example of the configuration of the dot angle conversion unit 21.

In the configuration shown in FIG. 8, a memory circuit 211 comprises a plurality of memories A–N. Each memory, A–N, may contain the predetermined number of bits of one main scan line. The predetermined number of bits is larger than the number of bits of a mark of the maximum main scan size that may be output from the boundary tracing unit 12. A write address control circuit 212 writes data, output from the boundary tracing unit 12, sequentially into memories A–N.

Figure 9:
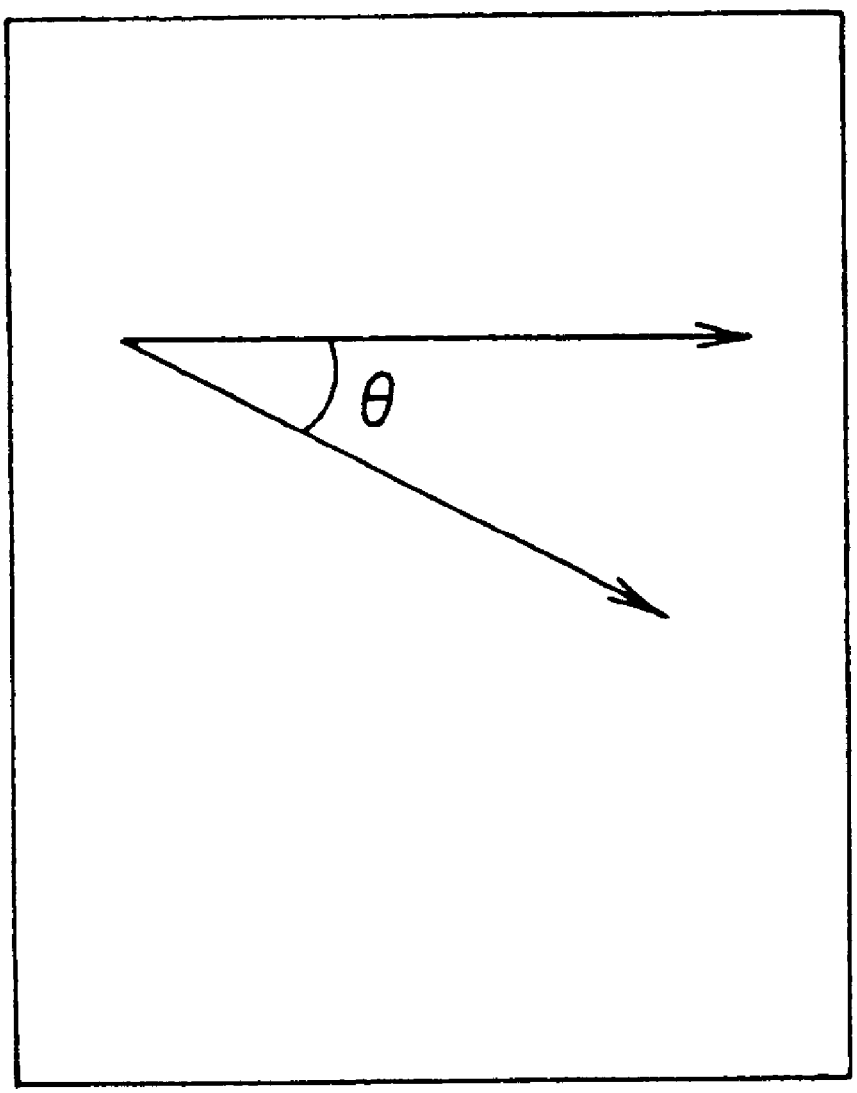
FIG. 9 is a diagram illustrating an example of a direction in which data is read from a memory of the dot angle conversion unit.

A read address control circuit 213 reads data from memories, A–N, into the direction inclined θ degrees, which is a difference angle between the dot angle indicated by the dot angle signal and a specific angle (0 degree or 45 degrees), as shown in FIG. 9. A counter 215 counts the number of bits written into the memory, and a control ROM 214 outputs a signal indicating one of the memories, A–N, of the memory circuit 211 from which data is to be read based on the dot angle signal and the count value in the counter 215.

An example of dot angle conversion processing will be described with reference to the diagrams shown in FIGS. 10 and 11. In the example shown in FIGS. 10 and 11, the memory circuit 211 comprises five memories, A–E, each composed of 20 bits. The counter 215 counts the number of bits, 1–100, that is written into the memory. In this example, data is written into memory E when the count value is in the range 1–20, data is written into memory A when the count value is in the range 21–40, data is written into memory B when the count value is in the range 41–60. Data is written into memory C when the count value is in the range 61–80, and data is written into memory D when the count value is in the range 81–100.

In response to the dot angle indicated by the dot angle signal and the count in the counter 215, the control ROM 214 outputs a signal indicating a memory from which data is to be read and an address within the memory at which the data read operation is to start. In the example shown in FIGS. 10 and 11, when the count of the counter 215 is 1 or 2, the control ROM 214 outputs the signal indicating that data be read from address 0 or 1 in memory A. When the count value is 3, the control ROM 214 outputs the signal indicating that data be read from address 2 in memory B; when the count value is 4 or 5, the control ROM 214 outputs the signal indicating that data be read from address 3 or 4 in memory C; and when the count value is 6, the control ROM 214 outputs the signal indicating that data be read from address 5 in memory D.

In addition, when the count value of the counter 215 is 7 or 8, the control ROM 214 outputs the signal indicating that data be read from address 6 or 7 in memory A. When the count value is 9, the control ROM 214 outputs the signal indicating that data be read from address 8 in memory B; when the count value is 10 or 11, the control ROM 214 outputs the signal indicating that data be read from address 9 or 10 in memory C; and when the count value is 12, the control ROM 214 outputs the signal indicating that data be read from address 11 in memory D.

And, when the count value of the counter 215 is 13 or 14, the control ROM 214 outputs the signal indicating that data be read from address 12 or 13 in memory A. When the count value is 15, the control ROM 214 outputs the signal indicating that data be read from address 14 in memory B; when the count value is 16 or 17, the control ROM 214 outputs the signal indicating that data be read from address 15 or 16 in memory C; and when the count value is 18, the control ROM 214 outputs the signal indicating that data be read from address 17 in memory D. In addition, when the count value is 19 or 20, the control ROM 214 outputs the signal indicating that data be read from address 18 or 19 in memory A.

The read address control circuit 213 sends the address signal generated in response to the signal from the control ROM 214, as well as the read control signal, to the memory circuit 211 to read data from the memory circuit 211.

When the counter value of the counter 215 is in the range 21–100, data is read similarly from the memories where data is not being written.

The control ROM 214 contains information on the dot angles and address specification data specifying a memory and an address from which data is to be read in response to the count value in the counter 215. Therefore, as the dot angle indicated by the dot angle signal varies, the control ROM 214 outputs address specification data specifying the memory and the address according to the dot angle. This means that, regardless of which dot angle signal is received, data is read into the direction according to the dot angle indicated by the dot angle signal and, therefore, the data that has been read always has the specific dot angle of 0 degree or 45 degrees.

Although the dot angle is converted (changed) when data is read from the memory circuit 211 in the above description, data may be written into the memory circuit 211 in such a direction that the dot angle may be converted. In that case, data is read sequentially from memories, A–E.

Figure 13:
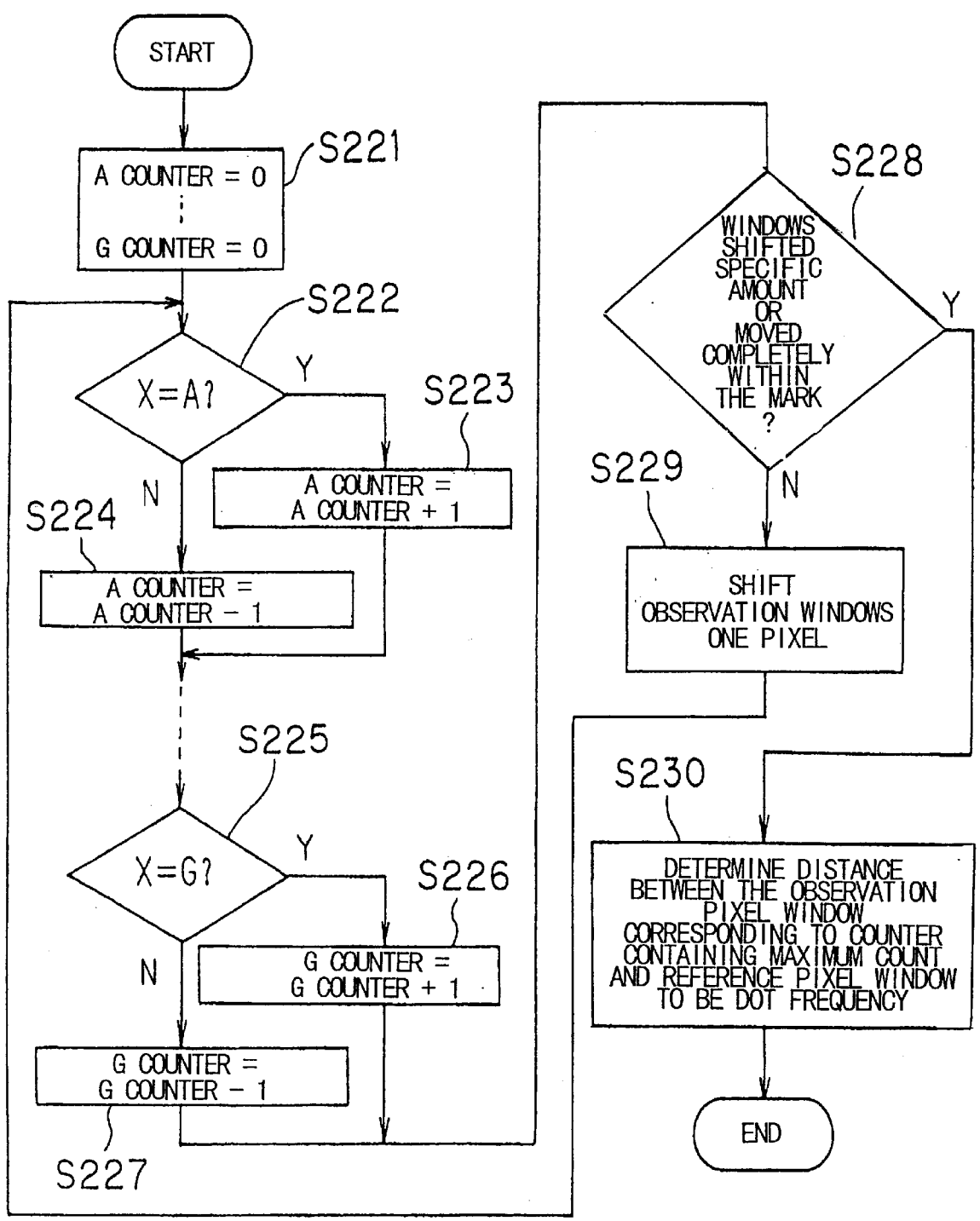
FIG. 13 is a flowchart showing dot frequency detecting processing.
Figure 14:
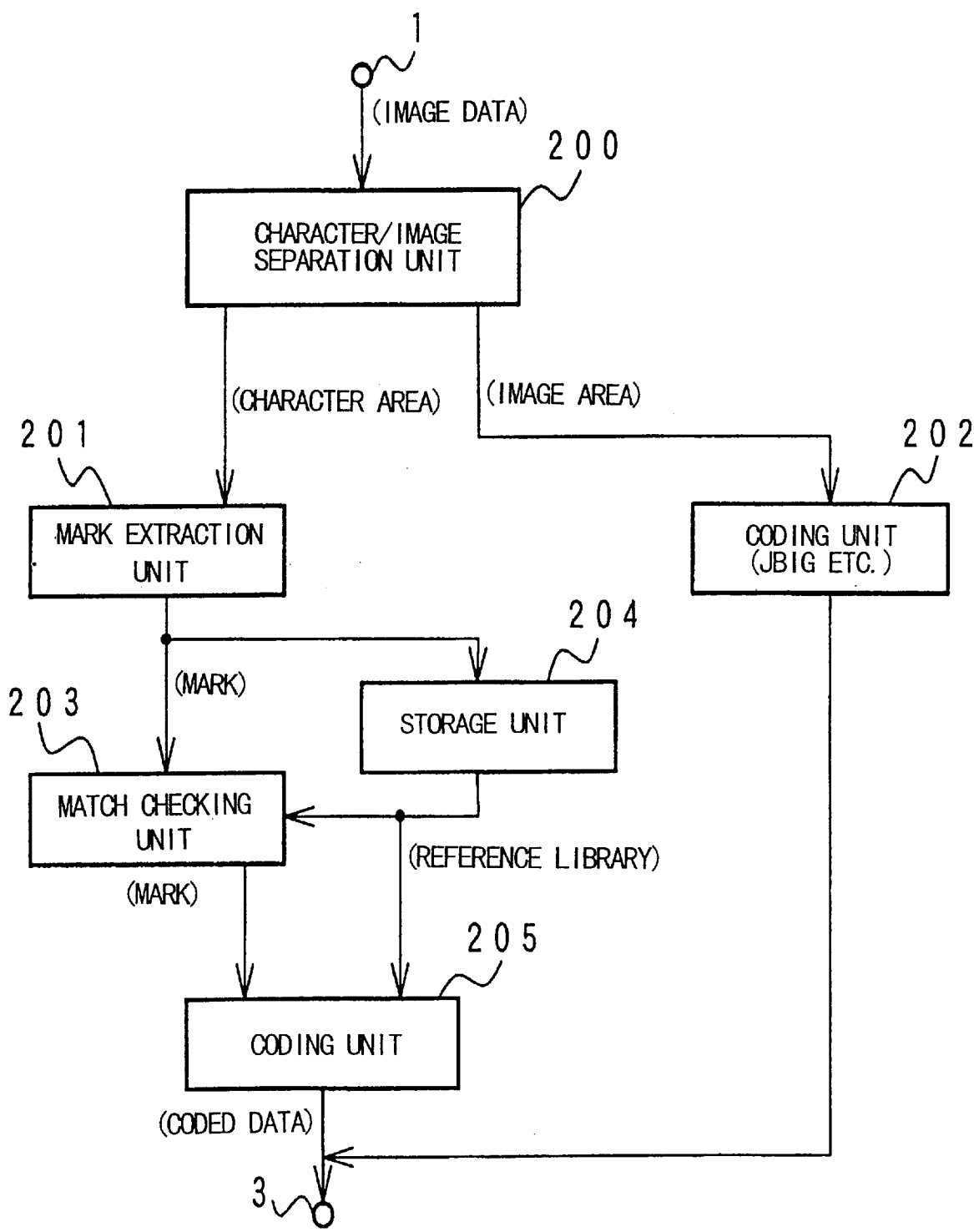
FIG. 14 is a diagram showing the configuration of a conventional coder.

After the dot angle conversion unit 21 converts the dot angle, the in-mark correlation checking unit 22 finds the dot frequency (interval). FIG. 12 is a diagram illustrating an example of observation windows used by the in-mark correlation checking unit 22 to find the dot frequency. FIG. 13 is a flowchart showing dot frequency checking processing.

The in-mark correlation checking unit 22 observes image data (a relatively large mark for which dot angle conversion has been made), output from the dot angle conversion unit 21, via the observation windows shown in FIG. 12. The width (number of bits) of the observation windows is slightly larger than the maximum possible dot frequency (interval). In the example, X is the reference pixel window that is at the leftmost position, and A–G are the observation windows that are to the right of X. In the example shown in FIG. 12, the observation windows are seven pixels in width.

As shown in FIG. 13, the in-mark correlation checking unit 22 first clears the counters, A–G, provided for the observation pixel windows, A–G, respectively (step S221). Then, the unit compares the pixel level of the reference pixel window X with the pixel level of observation pixel A (step S222). If the pixel levels match, the unit increments the A counter by 1 (step S223); if they do not match, the unit decrements the A counter by 1 (step S224).

The same processing is performed for observation pixel windows B–G. For example, the unit compares the pixel level of the reference pixel window X with the pixel level of the observation pixel G (step S225). If the pixel levels match, the unit increments the G counter by 1 (step S226); if they do not match, the unit decrements the G counter by 1 (step S227).

After the above processing, the observation windows are shifted to the right one pixel. If the windows have been shifted the specific amount or if the windows have moved completely within the mark (a relatively large mark), control is passed to step S230; otherwise, the observation windows are shifted to the right one pixel (step S229) and steps S222–S227 are repeated. The specific amount refers to an amount larger than the maximum possible dot frequency (interval), that may appear in the image data output from the dot angle conversion unit 21.

In step S230, the maximum count value is selected from the counts in the A–G counters, and the distance between the observation pixel window corresponding to the counter containing the maximum count and the reference pixel window X is determined to be the dot frequency.

For example, assume that the dot frequency is five pixels. Then, because there is a high correlation between two pixels that are five pixels apart, there is a high possibility that the pixel level of the observation pixel window E that is five pixels away from the reference pixel window X matches the pixel level of the reference pixel. That is, there is a high possibility that the E counter is incremented by 1. Even when the observation windows are shifted by one pixel, there is a high possibility that the pixel level of the observation pixel window E in the new position that is five pixels away from the reference pixel window X matches the pixel level of the reference pixel.

Therefore, when the dot frequency (interval) is five pixels, the value of the E counter should become largest as the observation windows are moved and the counter values are incremented and decremented. Thus, the distance (=five pixels) between the observation pixel window E corresponding to the E counter and the reference pixel window X is determined as the dot frequency (interval).

As described above, the in-mark correlation checking unit 22 used in this embodiment determines the dot frequency according to the correlation within the mark.

The in-mark correlation checking unit 22 outputs the determined dot frequency to the mark re-dividing unit 23. The mark re-dividing unit 23 divides the mark (relatively large mark), received from the dot angle conversion unit 21, by the dot frequency. The mark may be divided by an integral multiple of the dot frequency. The marks generated as a result of the division are output to the match determination unit 13 and the storage FIFO memory 14.

The match determination unit 13 compares a mark in the character area sent from the boundary tracing unit 12 or a mark that is an area composed of isolated dots in the image area with the mark in the storage FIFO memory 14, that is, the mark in the library, to find a matching mark.

In this context, "matching" means that the following conditions are satisfied:

(1) The difference between the size of an input mark and the size of a mark in the library is smaller than the predetermined value both vertically and horizontally (For example, the difference is one pixel or smaller both vertically and horizontally).

(2) When an input mark is put on top of a mark in the library, the number of unmatched pixels is equal to less than the predetermined value (for example, 20 pixels or less).

When the above condition is satisfied, it is determined that a mark sent from the boundary tracing unit 12 or the mark re-dividing unit 23 matches a mark in the library. When the library contains a plurality of matching marks, the matching mark detected first is treated as a matching mark.

When a match is found, the match determination unit 13 outputs both the input mark and the matching mark in the library to the match template processing unit 32. The match template processing unit 32 outputs the reference pixels (indicated by 1–4) in the match template of the received mark, shown in FIG. 15(A), and the reference pixels (indicated by 5–11) in the match template of the matching mark in the library, shown in FIG. 15(B), to the arithmetic coding unit (coder) 33.

When the library does not contain a mark that matches the mark sent from the boundary tracing unit 12 or the mark re-dividing unit 23, the match determination unit 13 outputs the received mark to the unmatch template processing unit 31. The unmatch template processing unit 31 outputs the reference pixels (indicated by 1–10) in the unmatch template, shown in FIG. 16, to the arithmetic coder 33.

The storage FIFO memory 14 adds to the library the marks sent from the boundary tracing unit 12 or the mark re-dividing unit 23. Therefore, as coding processing proceeds, the library contains more marks.

The arithmetic coder 33 receives the reference pixel values from the match template processing unit 32 and the unmatch template processing unit 31, gets a probability value with the use of the probability estimation table, and arithmetically codes the probability value. The coded data is output to the output terminal 3. As described above, the arithmetic coder 33 also codes the dot angle signal as well as the mark position information from the boundary tracing unit 12 and the mark re-dividing unit 23, and outputs the coded data.

As described above, the dot frequency in an image area is determined in this embodiment so that a mark may be extracted even from the image area. Therefore, a mark in the library which matches the extracted mark may be used in an image area as in a character area. This capability increases the coding efficiency of a system where there are relatively many (or a greater extent of) dot areas, such as a newspaper telephotography system. In addition, because the mark re-dividing unit 23 re-divides a mark by the dot frequency to generate a plurality of marks, the size of a mark processed by the match determination unit 13 becomes smaller. Therefore, it is more likely that the library contains a mark that matches an extracted mark. This also increases the coding efficiency.

In addition, the use of the dot angle signal used to convert the dot angle of a mark extracted from the boundary tracing unit 12 allows the in-mark correlation checking unit 22 to find the dot frequency even if the dot angle of the input image data is not 0 degree or 45 degrees. As a result, the mark re-dividing unit 23 may re-divide a mark even if the dot angle of the input image data is not 0 degree or 45 degrees.

Therefore, the coding efficiency may be increased, for example, in a color newspaper telephotography system. It should be noted that, when the dot angle is 0 degree or 45 degrees, the dot angle conversion unit 21 directly outputs data, received from the boundary tracing unit 12, to the in-mark correlation checking unit 22 and mark re-dividing unit 23 without any modification.

The meritorious effects of the present invention are summarized as follows.

As described above, the coding method and the coder according to the present invention separate an image area from input image data, convert the dot angle of image data in the image area into a specific angle, find the dot frequency of the image data whose dot angle has been converted, and divide the image data whose dot angle has been converted by the dot frequency or by an integral multiple of the dot frequency. This configuration allows even an image area to be coded through pattern matching and, at the same time, the dot frequency to be found easily, thus enabling marks to be generated effectively using pattern matching. In particular, the dot angle conversion processing increases the coding efficiency even when an image with an dot angle other than 0 degree or 45 degrees must be processed, for example, in a color paper telephotography system.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A coding method using pattern matching, wherein searching is performed in a library for a first mark that matches a second mark composed of a plurality of pixels in input image data and, if the library contains the matching first mark, coding of the input image data is performed by referencing the pixels of the first mark in the library and the pixels of the second mark in the input image data, said method comprising the steps of:
   separating an image area from the image data;
   converting a dot angle of the image data in the image area to a specific angle;
   finding a dot frequency of the image data whose dot angle has been converted; and
   dividing the image data, whose dot angle has been converted, by the dot frequency or by an integral multiple of the dot frequency into a plurality of marks.

2. The coding method using pattern matching as defined by claim 1 wherein the specific angle is 0 degree or 45 degrees.

3. The coding method using pattern matching as defined by claim 1, wherein, when the library contains the matching first mark, the pixels positioned beyond a position of a processing target pixel are also included in the reference pixels.

4. The coding method using pattern matching as defined by claim 3 wherein, when the library does not contain the matching first mark, coding of the input image data with the pixels in a predetermined template as the reference pixels is performed.

5. The coding method using pattern matching as defined by claim 1, wherein an extracted new mark is added to the library.

6. The coding method as defined by claim 1,
   wherein the specific angle is 0 degree or 45 degrees,
   wherein, when the library contains the matching first mark, the pixels positioned beyond a position of a processing target pixel are also included in the reference pixels, and
   wherein, when the library does not contain the matching first mark, coding of the input image data with the pixels in a predetermined template as the reference pixels is performed.

7. The coding method as defined by claim 6, wherein an extracted new mark is added to the library.

8. A coder using pattern matching, wherein said coder has a match determination unit which searches a library for a first mark that matches a second mark composed of a plurality of pixels in input image data, and a coding unit which, if the library contains the matching first mark, codes the input image data by referencing the pixels of the first mark in the library and the pixels of the second mark in the input image data, said coder comprising:
   a character/image separation unit configured to extract an image area from the image data;
   a dot angle conversion unit configured to convert a dot angle of the image data in the image area into a specific angle, said image area being extracted by said character/image separation unit;
   a dot frequency detecting unit configured to find a dot frequency from the image data converted by said dot angle conversion unit; and
   a mark re-dividing unit configured to divide the image data, converted by said dot angle conversion unit, by a result found by said dot frequency detecting unit to generate marks for output to said match determination unit.

9. The coder using pattern matching as defined by claim 8 wherein the mark re-dividing unit is configured to divide, the image data by the dot frequency or by an integral multiple of the dot frequency, said image data being converted by the dot angle conversion unit.

10. The coder using pattern matching as defined by claim 8 wherein the dot frequency detecting un it is configured to find a correlation of the image data converted by the dot angle conversion unit.

11. The coder using pattern matching as defined by claim 8 wherein the dot angle conversion unit has a plurality of memories containing the image data converted by the dot angle conversion unit, and configured to convert the image data by writing the image data into, or reading the image data from, the memories in a direction inclined by a difference angle between the dot angle and the specific angle.

12. The coder using pattern matching as defined by claim 8 wherein the coding unit comprises:
   a match template processing unit configured, if the library contains the matching first mark, to use the pixels of a predetermined template of the first mark in the library and pixels of a predetermined template of the second mark in the input image data as reference pixels;
   an unmatch template processing unit configured, if the library does not contain the matching first mark, to use pixels of a predetermined unmatch template of the second mark in the input image data as the reference pixels; and an arithmetic coding unit configured to estimate a probability of a pixel level of a processing target pixel using reference pixel values from said match template processing unit and said unmatch template processing unit, and to arithmetically code the estimation value.

13. The coder as defined by claim 9 wherein the dot frequency detecting unit is configured to find a correlation of the image data converted by the dot angle conversion unit.

14. The coder as defined by claim 13 wherein the dot angle conversion unit has a plurality of memories containing the image data converted by the dot angle conversion unit, and configured to convert the image data by writing the image data into, or reading the image data from, the memories in a direction inclined by a difference angle between the dot angle and the specific angle.

15. The coder as defined by claim 13 wherein the coding unit comprises:

a match template processing unit configured, if the library contains the matching first mark, to use the pixels of a predetermined template of the first mark in the library and pixels of a predetermined template of the second mark in the input image data as reference pixels;

an unmatch template processing unit configured, if the library does not contain the matching first mark, to use pixels of a predetermined unmatch template of the second mark in the input image data as the reference pixels; and an arithmetic coding unit configured to estimate a probability of a pixel level of a processing target pixel using reference pixel values from said match template processing unit and said unmatch template processing unit, and to arithmetically code the estimation value.

16. The coder as defined by claim 14 wherein the coding unit comprises:

a match template processing unit configured, if the library contains the matching first mark, to use the pixels of a predetermined template of the first mark in the library and pixels of a predetermined template of the second mark in the input image data as reference pixels;

an unmatch temp ate processing unit configured, if the library does not contain the matching first mark, to use pixels of a predetermined unmatch template of the second mark in the input image data as the reference pixels; and an arithmetic coding unit configured to estimate a probability of a pixel level of a processing target pixel using reference pixel values from said match template processing unit and said unmatch template processing unit, and to arithmetically code the estimation value.

* * * * *